(12) United States Patent
Laugwitz et al.

(10) Patent No.: US 10,745,868 B2
(45) Date of Patent: Aug. 18, 2020

(54) GROUND COMPACTION ROLLER WITH SENSOR DEVICE ON THE ROLLER DRUM, AND METHOD FOR ASCERTAINING THE GROUND STIFFNESS

(71) Applicant: BOMAG GMBH, Boppard (DE)

(72) Inventors: Niels Laugwitz, Lahnstein (DE); Robert Laux, Neuwied (DE)

(73) Assignee: BOMAG GMBH, Boppard (DE)

( * ) Notice: Subject to any disclaimer, the term of this patent is extended or adjusted under 35 U.S.C. 154(b) by 0 days.

(21) Appl. No.: 16/320,226

(22) PCT Filed: Jul. 18, 2017

(86) PCT No.: PCT/EP2017/000866
§ 371 (c)(1),
(2) Date: Jun. 3, 2019

(87) PCT Pub. No.: WO2018/019407
PCT Pub. Date: Feb. 1, 2018

(65) Prior Publication Data
US 2019/0382966 A1    Dec. 19, 2019

(30) Foreign Application Priority Data

Jul. 26, 2016  (DE) .................. 10 2016 009 085

(51) Int. Cl.
*E01C 19/28*    (2006.01)
*E01C 19/23*    (2006.01)
(Continued)

(52) U.S. Cl.
CPC .......... *E01C 19/288* (2013.01); *E01C 19/236* (2013.01); *E01C 19/26* (2013.01);
(Continued)

(58) Field of Classification Search
CPC ........ E01C 19/23; E01C 19/233; E01C 19/28; E01C 19/288
(Continued)

(56) References Cited

U.S. PATENT DOCUMENTS 5,727,900 A * 3/1998 Sandstrom ............ E01C 19/288
404/122
7,168,885 B2   1/2007 Rio et al.
(Continued)

FOREIGN PATENT DOCUMENTS

CN       102691248        9/2012
DE       102011088567     6/2013
(Continued)

OTHER PUBLICATIONS

Examination Report from corresponding German Appln. No. 10 2016 009 085.5, dated May 19, 2017.
(Continued)

*Primary Examiner* — Gary S Hartmann
(74) *Attorney, Agent, or Firm* — Grossman, Tucker, Perreault & Pfleger, PLLC (57) ABSTRACT

A ground compaction roller, in particular a tandem roller or a single-drum roller, having a machine frame, a drive unit, at least one roller drum mounted on the machine frame for rotation about a rotation axis, an exciter device arranged at least partially in the roller drum, and a sensor device for measuring the compaction of a ground achieved by a passage of the ground compaction roller, said sensor device being arranged on the roller drum in the region of the rotation axis and rotating together with the roller drum during operation of the ground compaction roller. The invention also relates to a method for ascertaining the ground stiffness during ground compaction with a ground compaction roller, in particular a tandem roller or a single-drum roller, comprising the steps of: measuring the acceleration directly at a roller drum which rotates during operation, ascertaining the ground stiffness from the measured values, wirelessly transmitting the measured values and/or the ground stiffness values to a receiving device.

20 Claims, 3 Drawing Sheets

(51) Int. Cl.
*E01C 19/26* (2006.01)
*E02D 3/026* (2006.01)
*G01N 3/34* (2006.01)
*G01P 15/00* (2006.01)

(52) U.S. Cl.
CPC .......... *E01C 19/282* (2013.01); *E01C 19/286* (2013.01); *E02D 3/026* (2013.01); *G01N 3/34* (2013.01); *G01P 15/00* (2013.01)

(58) Field of Classification Search
USPC .................................................. 404/84.1, 117
See application file for complete search history.

(56) References Cited

U.S. PATENT DOCUMENTS

| | | | |
|---|---|---|---|
| 8,190,338 B2 * | 5/2012 | Commuri .............. | E01C 19/288 701/50 |
| 9,039,319 B2 | 5/2015 | Oetken | |
| 9,206,564 B2 * | 12/2015 | Marsolek .............. | E01C 19/286 |
| 9,222,226 B2 | 12/2015 | Villwock et al. | |
| 9,389,156 B2 | 7/2016 | Anderegg et al. | |
| 10,036,129 B2 * | 7/2018 | Oetken ................. | E01C 19/288 |
| 10,435,852 B2 * | 10/2019 | Pistrol ...................... | G01N 3/32 |
| 2015/0030392 A1 * | 1/2015 | Commuri ................ | E01C 19/23 404/75 |
| 2015/0308057 A1 | 10/2015 | Marsolek et al. | |
| 2017/0159246 A1 * | 6/2017 | Pistrol ...................... | G01N 3/32 |
| 2019/0025175 A1 * | 1/2019 | Laugwitz ................ | G01N 9/36 |

FOREIGN PATENT DOCUMENTS

| | | |
|---|---|---|
| DE | 102014018457 | 7/2015 |
| DE | 202015003158 | 8/2015 |
| EP | 2627826 | 9/2014 |

OTHER PUBLICATIONS

English translation of the International Search Report from corresponding PCT Appln. No. PCT/EP2017/000866, dated Sep. 26, 2017.

English translation of the Written Opinion from corresponding PCT Appln. No. PCT/EP2017/000866, dated Sep. 26, 2017.

* cited by examiner

GROUND COMPACTION ROLLER WITH SENSOR DEVICE ON THE ROLLER DRUM, AND METHOD FOR ASCERTAINING THE GROUND STIFFNESS

FIELD

The invention relates to a ground compaction roller, in particular a tandem roller or a single-drum roller. The invention further relates to a method for ascertaining the ground stiffness during ground compaction with a ground compaction roller, in particular a tandem roller or a single-drum roller.

BACKGROUND

Generic ground compaction rollers are employed to increase the stability of an underlying ground and thus the load bearing capacity of said ground, for example for roads or buildings, i.e., to compact the underlying ground to a desired stability. For this, the generic ground compaction rollers, which are preferably self-propelled, frequently include a machine frame, a drive unit and at least one roller drum mounted on the machine frame for rotation about a rotation axis. In the case of a tandem roller, the ground compaction roller typically includes two roller drums, which are, for example, each connected to the machine frame via a pivot joint or are mounted on two machine frame halves connected to each other via an articulated joint. The machine weight of the tandem roller is distributed over the two roller drums and utilized for compaction of the ground. The traveling mechanism of a single-drum roller, on the other hand, typically includes only one roller drum which is complemented by a pair of wheels. In working operation of the ground compaction roller, the latter typically travels in a working direction across the underlying ground to be compacted. In operation, the ground compaction rollers oftentimes alternate between forward and backward travels. To influence, and in particular increase, the compaction of the ground using the generic ground compaction rollers, the ground compaction rollers usually include an exciter device arranged at least partially in the roller drum. This exciter device is also called an oscillation or vibration exciter. It typically comprises an imbalance mass which is set into rotation by an exciter motor and thereby caused to apply oscillations or vibrations to the roller drum. A corresponding ground compaction roller is known, for example, from DE 10 2014 018 457 A1.

In working operation of the generic ground compaction rollers, the underlying ground is typically passed several times until a desired compaction has been achieved. To recognize the point at which there is no use in performing further passages with the ground compaction roller because the ground is already compacted sufficiently or has almost reached its maximum compaction, it is known to provide the ground compaction rollers with a sensor device for measuring a parameter related to the current ground compaction. For this, the sensor device comprises one or more accelerometers with which the so-called ground stiffness of the ground material to be compacted can be ascertained as a measure for the degree to which the ground has already been compacted. A method for calculating the ground stiffness is known, for example, from EP 2 627 826 B1.

The prior art sensor devices are typically arranged on the machine frame, for example on a drum bearing, of the ground compaction roller. A disadvantage of such an arrangement is that the roller drums are usually vibration-decoupled, or vibration-damped, relative to the machine frame, and in particular the drum bearings on the machine frame, for example through suitable rubber dampers etc. In addition to a desired vibration decoupling between the roller drum and the machine frame, the oscillation of the roller drum is further damped by the play of the travel bearing via which the roller drum is connected to the machine frame. The oscillations of the roller drum, from which the ground stiffness can be calculated, are thus not fully transferred to the machine frame and thus the sensor device. This effect increases with the age of the ground compaction roller due to wear of the travel bearing and the resulting increase in play. As a result, the determination of the ground stiffness through the sensor device is relatively inaccurate in the prior art ground compaction rollers. To avoid these problems, DE 10 2011 088 567 A1 already suggests an even distribution of multiple sensors along the inner circumference of the drum shell to obtain a more accurate picture of the actual movement of the roller drum. However, the implementation of such a system is complicated due to the plurality of necessary sensors and the necessity to process the signals in a central evaluation unit.

SUMMARY

The object of the present invention is therefore to achieve a significant improvement in measuring accuracy when determining the ground stiffness in operation of a ground compaction roller while at the same time reducing manufacturing efforts.

More specifically, with a generic ground compaction roller, the object is achieved by a configuration in which the sensor device is arranged on the roller drum in the region of the rotation axis and rotates together with the roller drum during operation of the ground compaction roller. During operation, the sensor device thus moves together with the roller drum, is fixed in place relative to the roller drum, and changes its position relative to the machine frame. The sensor device is thus arranged on a part of the roller drum which rotates together with the roller drum. The roller drum is part of the traveling mechanism of the ground compaction roller and rotates about its rotation axis in working operation. It is connected to the stationary, non-rotating machine frame via travel bearings, for example drum bearings. In contrast to previous arrangements, according to the invention, the sensor device is not arranged on a stationary part of the machine frame, for example the drum bearing, but at the roller drum itself. More particularly, the sensor device is arranged directly at the roller drum such that it is in fact not vibration-decoupled from the roller drum. Thus, neither damping elements nor, for example, travel bearings or rotary joints, which cause decoupling, even if only partially, of the oscillations of the roller drum from the sensor device due to their play, are positioned between the sensor device and the roller drum. The sensor device is thus connected to the roller drum in an undamped manner and is configured to oscillate or vibrate together with the roller drum. Due to the arrangement of the sensor device directly at the roller drum in the described manner, the sensor device can determine the ground stiffness with very high accuracy and without distortion by a damping of the vibrations or oscillations of the roller drum. The invention is suitable for all ground compaction machines having roller drums with a vibration device, and thus also, for example, for hand-guided ground compaction rollers. According to the invention, the sensor device is arranged in the region of the rotation axis of the roller drum. More particularly, the sensor device is preferably arranged directly on the rotation axis of the roller drum. In this position, the rotation axis of the roller drum crosses the sensor device. It is, however, also possible that the sensor device is arranged slightly offset relative to the rotation axis of the roller drum, although an arrangement as close as possible to the rotation axis is preferred. In the present context, "in the region of the rotation axis" in particular means that the sensor device is spaced from the rotation axis of the roller drum by no more than one third of its radius, preferably by no more than one fifth of its radius and more preferably by no more than one tenth of its radius. The radius refers in particular to the distance of the rotation axis of the roller drum from the inner shell surface of the hollow-cylindrical drum shell. The central arrangement as close as possible to the rotation axis minimizes the influence of rotary oscillations of the drum on the measuring signal.

In the present case, it is preferred to use accelerometers to determine the ground stiffness. Alternatively, it is, however, also possible, for example, to employ an angular rate sensor with which the rotation angle of the drum can subsequently be ascertained through integration. The ground stiffness can then be measured through evaluation of oscillation velocity sensors. It is also possible to employ a mechanical pendulum to measure the orientation of the roller drum or the sensor system. The features according to the invention described with respect to accelerometers may, where applicable, likewise be applied to the mentioned alternative systems. Since the accelerometers mostly used in the sensor devices have a measuring axis, they can measure the ground stiffness only if their measuring axis is oriented at a constant angle to the ground. Therefore, in prior art solutions, the sensor devices have always been arranged on the stationary machine frame of the ground compaction rollers with a fixed orientation of their measuring axis, for example parallel to the gravitational acceleration or at a specific, defined angle relative to the machine frame. The invention is based on the finding that a measurement of the ground stiffness may also be performed selectively at regular intervals, and that these selective measurements are sufficient in practice to achieve a sufficient determination of the ground stiffness during the work process. For example, with the sensor device according to the invention, it is in particular possible to calculate an exact ground stiffness value at least whenever the measuring axis of the sensor device is oriented parallel to the direction of the gravitational acceleration, which can be identified, for example, by the determined oscillation amplitude being the highest at this point. The measuring axis of the sensor device according to the invention is therefore preferably oriented perpendicular to the rotation axis of the roller drum, i.e., in the radial direction relative to the rotation axis. The measuring axis of the sensor device thus crosses the rotation axis in a plane perpendicular to the rotation axis. A sensor device oriented in such a manner thus reaches a position in which the measuring axis is oriented parallel to the direction of the gravitational acceleration after every half revolution. In this position, the sensor device according to the invention can then selectively determine a particularly exact ground stiffness value. The individual measuring points are each spaced from one another by half the circumference of the roller drum in the working direction of the ground compaction roller.

In addition to this, however, the present invention also enables continuous measurement of the ground stiffness. To this end, the sensor device preferably comprises at least two, and in particular exactly two, accelerometers, each having a measuring axis which is in particular oriented perpendicular to the rotation axis of the roller drum in the manner described above, said measuring axes being offset relative to one another by an angle, in particular by at least 60°, and more particularly by 90°. Due to the measuring axes of two accelerometers being offset relative to one another by an angle, the direction of the gravitational acceleration can be ascertained through mathematical combination of the two measurement results. For this, the measurement results are, for example, filtered using a low-pass filter to eliminate the oscillation movements of the roller drum from the results. To further increase the accuracy, it is possible, for example, to use a Kalman filter since the rotational speed of the drum cannot change at an arbitrary rate. The accuracy of these calculations is particularly high if the measuring axes of the two accelerometers are each, and in particular together, in a plane which is oriented perpendicular to the rotation axis of the roller drum. Within this plane, the measuring axes of the accelerometers are then offset relative to one another by an angle which is in particular 90°. Such an arrangement enables particularly simple calculation and particularly precise measurement. If the measuring axes are offset in the direction of the rotation axis, the offset of the measuring axes relative to one another is determined in a virtual plane perpendicular to the rotation axis into which the measuring axes are projected. Based on the acceleration signals of two accelerometers, the direction of the gravitational acceleration can be determined in a simple and precise manner through vector addition. As already described, various filtering techniques can be used to suppress the interfering influence of the oscillation movements to a sufficient degree. If the direction of the gravitational acceleration is known, a freely selectable measuring direction can be defined which is used to calculate the ground stiffness. The measured accelerations can thus be transferred from the rotating reference system of the drum into a space-fixed (non-rotating) reference system. The drum acceleration in the measuring direction can be obtained through the scalar product of the desired direction vector and the two acceleration vectors. In simple compaction measuring systems, the direction vector is frequently oriented vertically. For many applications, however, it is better to use a direction vector other than vertical since the maximum dynamic ground contact force does normally not act on the drum in the vertical direction. Since the angle of the ground contact force varies, it is advantageous if the direction vector of the measuring direction is freely selectable as required. The sensor device according to the invention is therefore particularly cost-effective since only one assembly group needs to be installed on the drum while an improved accuracy is nevertheless achieved due to the freely selectable measuring direction and avoidance of undesired damping influences.

For reasons of precision, it is preferred that the measuring axes of the accelerometers and the rotation axis of the roller drum intersect. According to a particularly preferred embodiment, the measuring axes of the accelerometers cross the rotation axis of the roller drum at a right angle (in a plane in which the rotation axis extends) and, moreover, are in particular offset relative to one another by 90° (in a plane or projection plane perpendicular to the rotation axis). This embodiment achieves the highest measuring accuracy. If the exciter device, i.e., the vibration exciter or oscillation exciter, of the roller drum is a one-shaft rotary exciter, i.e., includes only one exciter shaft, it is preferred that the measuring axes of the accelerometers cross not only the rotation axis of the roller drum but also the rotation axis of the exciter shaft. Moreover, the measuring axes of the accelerometers are preferably also arranged perpendicular to the rotation axis of the exciter shaft.

Roller drums are typically configured as hollow cylinders with a hollow space which is sealed by so-called cup washers in the region of the face sides, i.e., in the lateral region transverse to the working direction of the ground compaction roller. These cup washers typically also connect directly or indirectly to the travel bearings via which the roller drum is mounted on the machine frame. The cup washers and the hollow cylinder are usually connected to each another via welded connections. The cup washers thus belong to the roller drum and rotate about its rotation axis during operation of the ground compaction roller. Especially for reasons of space, it is now preferred that the sensor device is arranged on a cup washer of the roller drum, in particular the cup washer opposite a cup washer carrying the exciter motor, i.e., the cup washer at that side at which a travel motor for driving the rotational movement and thus the travel movement of the roller drum about its rotation axis is arranged. The sensor device is in this case in particular arranged centrally on the cup washer (with respect to the circle center of the cup washer), so that the rotation axis of the roller drum ideally extends through the sensor device. The sensor device is in particular arranged directly on the cup washer of the roller drum. While the sensor device may generally be arranged on each of the two cup washers of the roller drum, the side of the travel motor is frequently the only side that provides space for the sensor device in the region of the center of the cup washer. The opposite side, on the other hand, is normally the side where the exciter motor of the exciter or vibration exciter is arranged in the center of the cup washer. An arrangement of the sensor device on the cup washer located at the side of the travel motor is therefore normally the easiest to implement for the known basic designs.

In asphalt works, it is oftentimes important that the ground stiffness is measured at both outer ends of the roller drum transverse to the working direction, i.e., in the region of the two face sides of the roller drum. It is therefore preferred that two sensor devices are provided on the roller drum which are spaced from one another transversely to a working direction of the ground compaction roller, in particular in the manner according to the invention as described above, wherein an arrangement on each one of the cup washers of the roller drum is preferred. The respective sensor devices are thus each located in the opposite lateral regions at the face sides of the roller drum. A lateral region means, for example, an external face side portion of the roller drum transverse to the working direction, which comprises, for example, a maximum of 10%, preferably a maximum of 20%, and more preferably a maximum of 30%, of the total extension of the roller drum along its rotation axis. The roller drum respectively includes such a lateral region on both of its opposite face sides. According to a preferred embodiment, a respective one of the two sensor devices is thus arranged in each of these lateral regions of the roller drum spaced from one another transversely to the working direction. The two sensor devices may, for example, also consist in one sensor device according to the invention on a cup washer, in particular at the side of the travel motor of the roller drum, and one conventional sensor device at the opposite side of the roller drum, for example on the machine frame or the drum bearing. It is, however, preferred that a sensor device is arranged, in the manner according to the invention, i.e. In particular rotating together with the roller drum, also on the cup washer opposite the travel motor. Due to the central arrangement of the exciter motor, however, it is oftentimes not possible to arrange the accelerometers of this sensor device exactly in the center of the cup washer. However, it has turned out that it is sufficient if the accelerometers of this sensor device are arranged on the cup washer at the side of the exciter motor with an offset relative to the center of the cup washer, i.e., with an offset relative to the rotation axis of the roller drum and/or the exciter shaft. It is also preferred that these accelerometers of the sensor device at the vibration motor side also include measuring axes which are offset relative to one another by 90° and are in a plane which is arranged perpendicular to the rotation axis of the roller drum and/or the exciter shaft. All in all, due to the two sensor devices being arranged on opposite face sides of the roller drum, the ground stiffness can be measured separately on both sides of the roller drum spaced transversely to the working direction.

The prior art sensor devices are typically supplied with electrical power by the on-board grid of the ground compaction roller via cable connections. However, cable connections extending from the machine frame into the rotating and oscillating or vibrating roller drum are highly prone to failure and require large engineering efforts. According to a preferred solution according to the invention, the sensor device has an electrical power supply which is independent of the (frame-side) on-board grid of the ground compaction roller. For example, the sensor device may include a battery supplying electrical power to the sensor device. Moreover, other electrical power storage devices may be provided which allow for the supply of electrical power to the sensor device. The electrical power storage devices according to the invention are directly attached to the roller drum together with the sensor device, so that no sensitive cable connections need to be laid. In particular, this makes the electrical power supply of the sensor device independent of cable connections between the stationary machine frame and the rotating roller drum. Although the ground compaction roller includes an on-board grid or a further electrical power source for other loads, the electrical power supply according to the invention for the sensor device is distinct therefrom.

To reduce maintenance efforts, for example to avoid the need to replace an empty electrical power storage device, however, the sensor device ideally comprises a device for generating electrical power is is at least coupled to such a device. So-called energy harvesting devices, which generate electrical power from the vibration or oscillation and/or the rotational movement of the roller drum, are particularly suitable. In a preferred embodiment, the sensor device thus comprises an energy harvesting apparatus via which the sensor device is supplied with electrical power. Such an apparatus may be constructed, for example, on the principle of a linear generator. Besides this, there are further ways to generate electrical power for operation of the sensor device on or in the roller drum. For example, according to another preferred embodiment, the sensor device is supplied with electrical power by a generator driven by an exciter shaft of the exciter device. The exciter device is usually a mechanically or hydraulically driven rotary exciter which sets an imbalance mass on an exciter shaft into rotation, thereby generating oscillations or vibrations. The exciter shaft extends, in most cases inside the rotation axis of the roller drum, from one of the cup washers to the center of the roller drum transverse to the working direction. The exciter motor typically sits on the outer face side of a cup washer, so that the exciter shaft extends from outside through the cup washer and into the roller drum. This rotating shaft can now be utilized as a power source directly at the roller drum. For this, it is expedient to employ the rotating exciter shaft to drive a generator, for example a dynamo, via which the sensor device is supplied with electrical power. The generator is thus coupled to the exciter shaft of the exciter device and is driven by it. In this manner, the supply of electrical power to the sensor device is ensured permanently.

The generator might generally be coupled directly to the exciter shaft, i.e., driven directly by the exciter shaft. However, to make the drive of the generator as independent as possible of the specific design of the exciter shaft, it is preferred that a so-called through-drive shaft connects the exciter shaft of the exciter device and the generator to one another, and that the generator is driven by the exciter shaft via said through-drive shaft. The through-drive shaft thus designates a link between the exciter shaft and the generator which transmits the rotational movement from the exciter shaft to the generator. In this manner, the placement of the generator with respect to the exciter shaft can be varied. It is, for example, possible that the through-drive shaft extends through the cup washer, in particular the cup washer opposite the exciter motor, i.e., the cup washer at the side of the travel motor, and to the outside. All in all, the exciter motor then sits on the external face side of said cup washer transverse to the working direction. The generator is, for example together with the sensor device, arranged on the outer face side of said cup washer transverse to the working direction, i.e., the cup washer located at the side of the roller drum opposite the exciter motor, where the travel motor of the roller drum is located. At one end of the exciter shaft, the latter is set into rotation by the exciter motor. At its opposite end, it is connected to, and drives, the generator of the sensor device via the through-drive shaft. All in all, this achieves a reliable supply of electrical power to the sensor device which is independent of the on-board grid of the machine.

Moreover, according to a preferred embodiment, the generator is configured to detect the rotational position of an imbalance mass on the exciter shaft. For this, the winding of the generator is preferably configured such that a measurable voltage pulse is generated when the exciter shaft reaches a particular position relative to the stator of the generator. It is also possible that an induction coil is provided which is independent of the voltage supply of the sensor device and creates at least one pulse that corresponds to the rotation angle of the imbalance shaft. The advantage of the metrological detection of the current rotation angle of the exciter shaft consists in the higher accuracy of the calculation of the ground stiffness. The frequently selected approach for calculating the ground stiffness consists in subtracting the accelerations generated by the imbalance masses from the measured drum accelerations. This must be done in-phase to obtain an accurate result. Thus, the measurement of the correct phase angle for the imbalance mass can be more accurate than the estimate of the phase angle from the measured drum accelerations.

Further advantageous developed configurations of the invention relate to the transmission of the measured values ascertained by the sensor device. Again, a wired transmission is disadvantageous for the reasons mentioned above. Therefore, the sensor device is preferably configured such that it comprises a transmitting device which transmits the measurement results of the sensor device wirelessly to a receiving device, in particular a mobile receiving device. For this, it is generally possible to utilize any techniques for wireless data transmission via radio that are known in the prior art, for example WLAN. The transmitting device here sends either the raw data of the measurement of the sensor device or, where applicable, already the ground stiffness values calculated therefrom. In the latter case, the sensor device comprises a suitable device for electronic data processing such as a microprocessor which is programmed accordingly. The receiving device may, for example, be integrated into the on-board computer of the ground compaction roller. It receives the measurement data sent by the transmitting device and/or the calculated ground stiffness values. The receiving device preferably also comprises an indicating device via which the received an/or calculated values are indicated to an operator. Moreover, the receiving device comprises, for example, a data storage in which the measurement data and/or the calculated ground stiffness data can be stored and subsequently read out. In this manner, it is possible to subsequently perform an efficient evaluation of all the data of a specific work process, for example a construction site or a work day. In a preferred embodiment, however, the receiving device is not part of the on-board computer of the ground compaction roller but is a mobile receiving device. If compatible data transmission paths are used, such mobile receiving devices may, for example, be conventional tablet computers or smartphones. In this case, it is merely necessary to install a corresponding program or an app which receives and/or stores and/or indicates and/or evaluates the data sent by the transmitting device.

The object of the invention as mentioned above is further achieved with a method for ascertaining the ground stiffness during the compaction with a ground compaction roller, in particular a tandem roller or a single-drum roller, preferably with a ground compaction roller as described above, comprising the steps of: measuring the acceleration directly on, and in the region of the rotation axis of, a roller drum which rotates in working operation, ascertaining the ground stiffness from the measured values, and wirelessly transmitting the measured values and/or the ground stiffness values to a receiving device. The method is likewise based on the central idea of the invention that the acceleration is measured directly and immediately at the undamped rotating components of the roller drum in the region of the rotation axis, so that any measuring inaccuracy caused by a damping of the signal, for example due to a desired and/or undesired vibration-decoupling, is avoided. As such, all features, effects and advantages of the ground compaction roller having the sensor device according to the invention as described above also apply to the method according to the invention. This means in particular that the method according to the invention is intended for use with vibration-excited roller drums and is employed during operation of the vibration exciter. To avoid repetitions, reference is made to the above explanations in their entirety.

For the method as well, it is again preferred that the acceleration is measured using two accelerometers having measuring axes which are offset relative to one another by an angle, in particular by 90°. In this manner, instead of a merely selective measurement with a single accelerometer and only one measuring axis, a continuous measurement of the ground stiffness can be carried out during working operation of the ground compaction roller.

Further, ascertaining the ground stiffness from the measured values preferably comprises ascertaining the direction of the gravitational acceleration from the measured values of the two accelerometers. For this, a low-pass filter, and, where necessary, a Kalman filter, may be employed, as already described. In this manner, the measuring accuracy of the method can be increased.

BRIEF DESCRIPTION OF THE DRAWINGS

The invention will be explained in more detail below by reference to the embodiment examples shown in the figures. In the schematic figures.

DETAILED DESCRIPTION

Like parts and parts acting in a same manner are designated by like reference numerals in the figures. Recurring parts are not designated separately in each figure.

Figure 1:
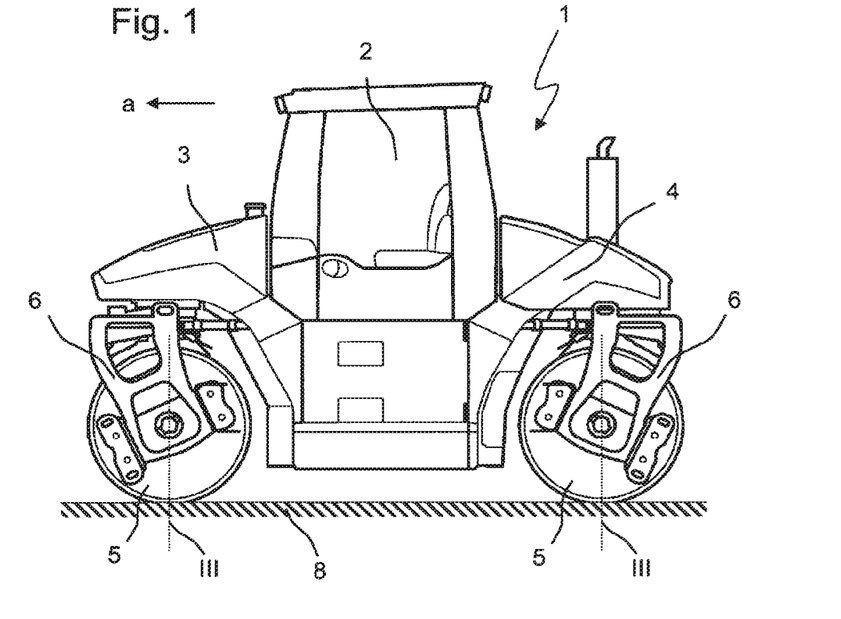
FIG. 1 is a side view of a tandem roller.
Figure 2:
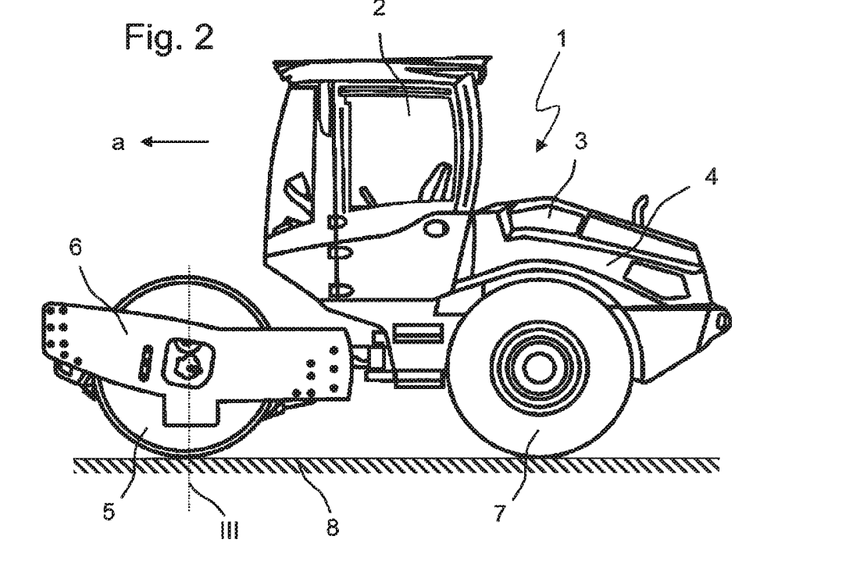
FIG. 2 is a side view of a single-drum roller.
Figure 7:
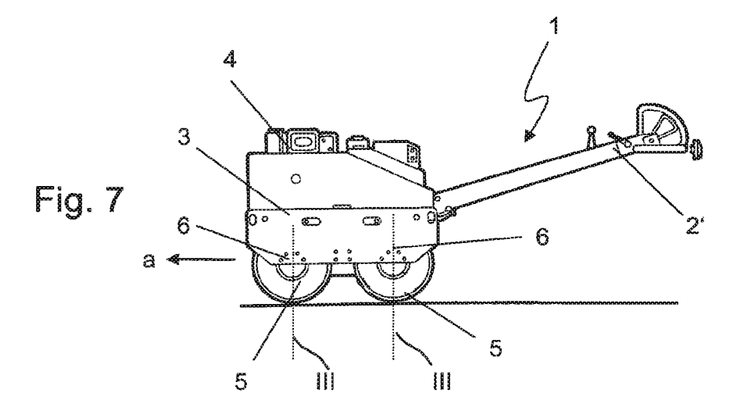
FIG. 7 is a side view of a hand-guided double vibration roller.

FIGS. 1, 2 and 7 show various ground compaction rollers 1 according to the invention, more particularly a ground compaction roller of the tandem roller type (FIG. 1), a ground compaction roller of the single-drum roller type (FIG. 2) and a ground compaction roller of the hand-guided double vibration roller type (FIG. 7). The ground compaction rollers of FIGS. 1 and 2 include an operator platform 2 and a machine frame 3. They are driven by a drive unit 4, in most cases a diesel combustion engine, and move across a ground 8 to be compacted in the working direction a during working operation. In the figures, the working direction a is defined as the forward direction of the ground compaction roller 1. In working operation, however, the ground compaction rollers 1 may just as well be employed for backward travels and may move against the working direction a. For ease of understanding of the description, however, the working direction a designates the forward direction indicated in the figures. The tandem roller of FIG. 1 includes a total of two roller drums 5, one being arranged at the front in the working direction a and one being arranged at the rear of the tandem roller in the working direction a. The roller drums 5 are connected to the machine frame 3 via drum bearings 6 which do not rotate together with the roller drum 5. Both roller drums 5 of the tandem roller of FIG. 1 are steered via pivot joints known in the prior art. The traveling mechanism of the single-drum roller of FIG. 2 comprises only one roller drum 5, which is arranged at the front in the working direction a, and a pair of wheels 7, for example rubber wheels, at the rear in the working direction a. The roller drum 5 of the single-drum roller is again connected to the machine frame 3 via a drum bearing 6 which is stationary and thus does not co-rotate. The single-drum roller, and in particular the roller drum 5 of the single-drum roller, are steered via an articulated joint located essentially beneath the operator platform 2. The hand-guided double vibration roller according to FIG. 7 has a comparable basic structure. Here, instead of an operator platform, a drawbar 2 is provided via which the machine is controlled by an operator in working operation.

Figure 3:
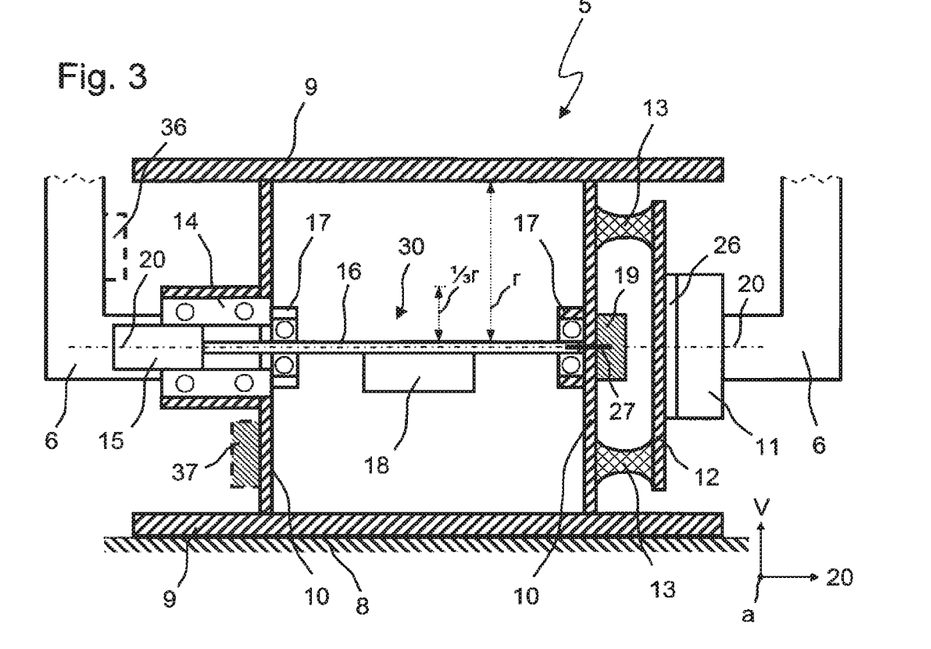
FIG. 3 is a cross-sectional view of a roller drum along line III of FIGS. 1 and 2.

The structure and function of the roller drums 5 of the ground compaction rollers 1 are explained in more detail with reference to FIG. 3. FIG. 3 is a cross-sectional view of the roller drums 5 along line III of FIGS. 1, 2 and 3. For orientation purposes, the coordinate system shown in FIG. 3 indicates the vertical direction V, the horizontal working direction a extending perpendicular to V, and the rotation axis 20, which also extends horizontally and further transversely to the working direction. The roller drum 5 comprises an outer shell 9 shaped as a hollow cylinder, with which it rests on the ground 8 to be compacted. At the outer face sides transverse to the working direction a, the roller drum 5 includes cup washers 10 which extend across the interior of the hollow cylinder. A travel motor 11, for example a hydraulic motor, is located at one of the cup washers 10, in FIG. 3 the one on the right-hand side. One side of the travel motor 11 is connected to the machine frame 3, which is not shown, via a drum bearing 6. The other side of the travel motor 11 is connected, via a rotary joint 26, to a drive wheel 12, which is in turn attached to the cup washer 10 via damping elements 13, in particular elastic damping elements 13. The damping elements 13 decouple the drive wheel 12, and thus the rotary joint 26 and the travel motor 11, from the vibrations or oscillations of the roller drum 5. Operation of the travel motor 11 sets the roller drum 5 into rotation about the rotation axis 20, causing the ground compaction roller to advance on the ground 8 in or against the working direction a. In FIG. 3, the components which rotate about the rotation axis 20 together with the roller drum 5 in working operation of the ground compaction roller are shown hatched for further illustration. Those components of the roller drum 5 which do not co-rotate are not hatched.

An exciter motor 15, for example a hydraulic motor, which is part of an exciter device 30, is located at the side of the roller drum 5 opposite the travel motor 11. The exciter motor 15 does not rotate about the rotation axis 20 together with the roller drum, and is connected to the cup washer 10 via a travel bearing 14. An exciter shaft 16 extends from the exciter motor 15 through the cup washer 10 and into the interior of the roller drum 5. The exciter shaft 16 is supported by shaft bearings 17 which are, for example, arranged on the cup washers 10 of the roller drum 5. An imbalance mass 18 is situated on the exciter shaft 16 in a manner known per se. The exciter motor 15 sets the exciter shaft 16 into rotational movement, which likewise runs about the rotation axis 20 in the shown embodiment example. The rotational movement of the exciter shaft 16 also causes the imbalance mass 18 to rotate about the rotation axis 20, thereby generating oscillations or vibrations of the roller drum 5, which are utilized for compaction of the ground 8.

A sensor device 19 is arranged on the cup washer 10 located at the side of the travel motor 11. In working operation, the sensor device 19 rotates together with the roller drum 5. More particularly, the sensor device 19 is arranged directly on the cup washer 10. It is in this case placed in the center of the cup washer 10 such that the rotation axis 20 about which the roller drum 5 rotates, and about which the exciter shaft 16 also rotates coaxially thereto, extends through the sensor device 19. Generally, the sensor device 19 is, for example, spaced from the rotation axis 20 no farther than one third of the radius r between the rotation axis 20 and the inner shell surface of the roller drum 5. By way of example, FIG. 3 shows both the radius r as well as one third of the radius r starting from the rotation axis 20. The sensor device 19 is located in a free space between the cup washer 10 and the drive wheel 12 which is created by the extension of the damping elements 13. The drive wheel 12 is in this case spaced from the cup washer 10 in the direction of the rotation axis, in particular such that there is no risk that the drive wheel 12 will collide with the sensor device 19 due to the elastic movements of the damping elements 13. In other words, via the damping elements 13, the drive wheel 12 is spaced from the cup washer 10 such that both an installation space for the sensor device 19 as well as a safety margin for the movements of the drive wheel 12 due to the elastic deformation of the damping elements 13 is provided between the drive wheel 12 and the cup washer 10. The sensor device 19 is located on the outer surface of the cup washer 10, i.e., the outer face side of the roller drum 5, transverse to the working direction a. The sensor device 19 is thus situated on the side of the cup washer 10 opposite the imbalance mass 18, and in particular the exciter shaft 16. In order to still realize the supply of electrical power to the sensor device 19 via the exciter shaft 16, a through-drive shaft 27 is provided which extends through the cup washer 10, is mounted therein for rotation, and connects the exciter shaft 16 to a generator (see FIG. 4) of the sensor device. In the embodiment example shown, the through-drive shaft 27 is configured as an axial extension of the exciter shaft 16 along the rotation axis 20, which extends through the cup washer 10 and thereby enables coupling of a generator of the sensor device 19 to the rotation movement of the exciter shaft 16. All in all, this enables the supply of electrical power to the sensor device 19, in particular solely and independently of an on-board grid of the ground compaction machine 1, through operation of the exciter motor 15, so that there is no need to replace electrical power storage devices which might be provided at the sensor device 19.

The sensor device 19 is configured for determining the ground stiffness during working operation of the ground compaction roller 1, as will be explained in more detail below. Due to the arrangement of the sensor device 19 directly on the roller drum 5, more particularly directly on a component of the roller drum 5 whose vibration movement has not yet be damped by a damping element or a bearing play of a travel joint or rotary joint, the sensor device 19 can determine the ground stiffness particularly exactly. This is possible in particular at the shown central position of the sensor device 19 on the cup washer 10 at the side of the travel motor 11 since the sensor device 19 here is located directly on the rotation axis 20 of the roller drum 5. However, due to its arrangement on one of the cup washers 10, the sensor device 19 will only detect the ground stiffness at that side of the roller drum 5 at which said cup washer 10 is located. Especially for asphalt applications, however, it is frequently desired to perform separate measurements of the ground stiffness at both face sides of the roller drum 5 spaced from one another transversely to the working direction a. At the side of the roller drum 5 opposite the travel motor 11, however, the center of the cup washer 10 is already occupied by the exciter device 30, more particularly the exciter motor 15 and the exciter shaft 16. Therefore, according to a preferred embodiment, the sensor device 19 according to the invention, which is arranged at the travel motor 11 side of the roller drum 5, is combined with a conventional sensor device 36 arranged at the opposite side of the roller drum 5. The conventional sensor device 36 is characterized by the fact that it is arranged on the machine frame 3 or on the drum bearing 6 and does therefore not rotate together with the roller drum 5. Therefore, a known prior art sensor device 36 may be used in combination with the sensor device 19 according to the invention. The sensor device 36 will provide less precise measured values compared to the sensor device 19 since the sensor device 36 only detects vibrations or oscillations of the roller drum 5 which have already been attenuated by damping elements and/or the travel bearing 14, i.e. its play. However, the combination with the sensor device 19 according to the invention at the opposite side of the roller drum 5 still achieves measurement results that are more exact, and thus ground stiffness values that are more reliable, than typical for prior art arrangements with two conventional sensor devices 36.

According to another preferred embodiment of the invention, the first sensor device 19 according to the invention is combined with a second sensor device 37 according to the invention. The second sensor device 37 is identical with the sensor device 19 but, in contrast to the latter, it is not arranged in the center of the cup washer 10 at the side of the travel motor 11 but on the cup washer 10 at the side of the exciter motor 15 and shifted outward from the center of the cup washer 10 in the radial direction with respect to the rotation axis 20. In other words, the sensor device 37 is arranged on the outer surface of the cup washer 10, i.e., the outer face side of the roller drum 5, transverse to the working direction a, at the side of the exciter motor 15. Due to the exciter motor 15, the sensor device 37 is shifted outward from the center of the cup washer 10 towards the outer shell 9 of the roller drum 5. Apart from this different arrangement of the sensor device 37, which is in particular offset relative to the rotation axis 20, however, the configuration of the sensor device 37 is identical to that of the sensor device 19. The different arrangement of the sensor device 37 must be taken into account when calculating the ground stiffness from the measured values of the sensor device 37. It is possible to use, for example, the exciter shaft 16 to also supply electrical power to the sensor device 37 by arranging a transmission which transfers the rotation of the exciter shaft 16 to a drive shaft of a generator of the sensor device 37. The combination of two sensor devices 19, 37 according to the invention enables very precise determination of the ground stiffness during the compaction of the ground 8 at both face sides of the roller drum 5 and is therefore perfectly suitable also for asphalt applications.

Figure 4:
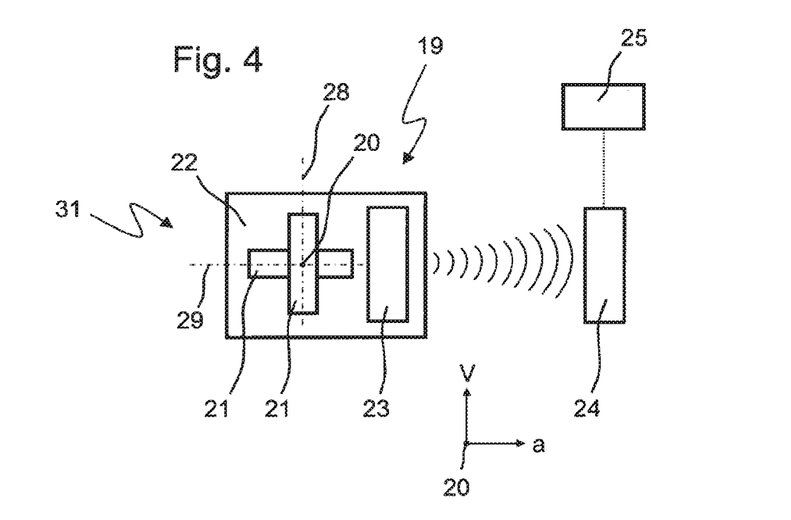
FIG. 4 is a side view of a sensor device.

The function of the sensor device 19 is explained in more detail by reference FIG. 4. The sensor device 19 comprises a generator 22 which is driven by the exciter shaft 16 via the through-drive shaft 27 and supplies electrical power to the sensor device 19. Moreover, the sensor device 19 in the present embodiment example comprises a total of two accelerometers 21 having a first measuring axis 28 and a second measuring axis 29. The accelerometers 21 are configured for determining an acceleration along the measuring axes 28, 29. The accelerometers 21 are in this case oriented relative to one another in such a manner that their measuring axes 28, 29 are orthogonal to one another in a common projection plane. At the same time, the measuring axes 28, 29 are orthogonal to the rotation axis 20 of the roller drum 5 or the exciter shaft 16. In the shown embodiment example of FIG. 4, the two measuring axes 28, 29 cross the rotation axis 20 orthogonally and thus extend in radial direction. Due to this arrangement of the measuring axes 28, 29 relative to one another, and in particular also relative to the rotation axis 20, the direction of the gravitational acceleration and also the ground stiffness can be ascertained continuously from the measured values of the accelerometers 21. Moreover, the sensor device 19 comprises a transmitting device 23 which is configured for wireless transmission of data from the sensor device 19 to a receiving device 24. The ground stiffness can be ascertained from the measured values of the accelerometers 21 either directly by the sensor device 19 or by the receiving device 24. Additionally or alternatively, a rotation angle sensor may also be used here which ascertains the angular position of the drum and thus the sensor device.

Depending on the configuration, the transmitting device 23 transmits either only the measurement data of the accelerometers 21 and/or the calculated ground stiffness values to the receiving device 24. The receiving device 24 is connected to an indicating device 25 which indicates the measured values and/or the calculated ground stiffness values to an operator. Moreover, the receiving device may store the data, so that it can be read out subsequently or continuously and an exact evaluation of the work process of the ground compaction roller is possible. The receiving device may be, for example, a handheld mobile device, for example a tablet computer or a smartphone.

According to a preferred embodiment of the invention, the sensor device 19 is configured as a retrofit kit 31 which can be retrofitted to already existing ground compaction rollers. The retrofit kit 31 in this case comprises the sensor device 19 according to the invention and is configured for installation on the cup washer 10 at the travel motor 11 side of the roller drum 5, and in particular for coupling to the exciter shaft 16 via the through-drive shaft 27. In particular in combination with a mobile receiving device 24, a retrofit kit 31 can thus be provided which can be attached to the already existing structures of a roller drum 5 relatively easily, thus enabling utilization of the advantages according to the invention.

Figure 5:
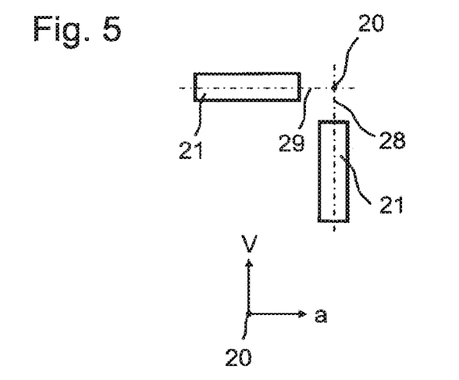
FIG. 5 shows an alternative arrangement of the accelerometers of the sensor device according to FIG. 4.

FIG. 5 shows an alternative arrangement of the accelerometers 21, which can be applied for both the sensor device 19 according to the invention as well as the second sensor device 37 according to the invention. In the embodiment shown, the measuring axes 28, 29 of the accelerometers 21 are orthogonal to one another. FIG. 5 shows an embodiment in which the accelerometers 21 are not positioned on the rotation axis 20 but the (virtual extensions of the) measuring axes 28, 28 are still oriented so as to cross the rotation axis 20. In the embodiment of FIG. 5, the measuring axes 28, 29 again cross the rotation axis 20 at an angle of 90°. The respective orientation or arrangement of the accelerometers 21 and the measuring axes 28, 29 must be taken into account accordingly when calculating the ground stiffness.

Figure 6:
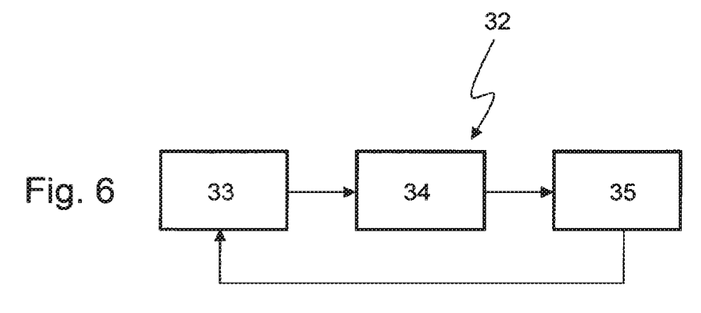
FIG. 6 is a flowchart of the method according to the invention.

FIG. 6 shows a flow chart of the method 32 according to the invention. The method starts with measuring 33 the acceleration through the accelerometers 21, said measuring being performed directly at components of the roller drum 5 which rotate during working operation and whose oscillation or vibration is undamped, neither by intended damping through damping elements nor by unintended damping due to play of bearings or joints. The further steps of the method consist in ascertaining 34 the ground stiffness from the measured values and wirelessly transmitting 35 the measured values and/or the ground stiffness values to a receiving device 24. Depending on whether or not the sensor device 19 already ascertains the ground stiffness values from the measured values, it is also possible to initially transmit 35 only the measured values to a receiving device 24, in which case the ascertaining 34 of the ground stiffness from the measured values is then done by the receiving device 24. The method is carried out by a ground compaction roller 1 having a sensor device 19 as described above. All in all, the invention results in particularly precise determination of the ground stiffness during ground compaction.

What is claimed is:

1. A ground compaction roller, comprising:
   a machine frame;
   a drive unit;
   at least one roller drum mounted on the machine frame for rotation about a rotation axis;
   an exciter device arranged at least partially in the roller drum;
   at least one sensor device configured to measure compaction of ground achieved by passage of the ground compaction roller;
   wherein the sensor device is arranged on the roller drum in a region of the rotation axis and rotates together with the roller drum during operation of the ground compaction roller;
   wherein the sensor device includes an electrical power supply which is independent of an on-board grid of the ground compaction roller; and
   wherein the sensor device is supplied with electrical power through a generator driven by an exciter shaft of the exciter device.

2. The ground compaction roller according to claim 1, wherein the sensor device comprises two accelerometers which each comprise a respective measuring axis.

3. The ground compaction roller according to claim 2, wherein the measuring axes of the accelerometers cross the rotation axis of the roller drum.

4. The ground compaction roller according to claim 1, wherein the sensor device is arranged on a circular support wall of the roller drum.

5. The ground compaction roller according to claim 1, wherein the at least one sensor device comprises two sensor devices on the roller drum which are spaced from one another transversely to a working direction of the ground compaction roller and are each arranged on a respective circular support wall of the roller drum.

6. The ground compaction roller according to claim 1, wherein a through-drive shaft connects the exciter shaft of the exciter device and the generator, and the generator is driven by the exciter shaft via the through-drive shaft.

7. The ground compaction roller according to claim 1, wherein the generator is configured to detect a rotational position of an imbalance mass on the exciter shaft.

8. The ground compaction roller according to claim 1, wherein the sensor device comprises a transmitting device which transmits measurement results of the sensor device wirelessly to a mobile receiving device.

9. The ground compaction roller according to claim 1, wherein the ground compaction roller is a tandem roller or a single-drum roller.

10. The ground compaction roller according to claim 2, wherein each measuring axis is orientated orthogonally to the rotation axis of the roller drum.

11. The ground compaction roller according to claim 2, wherein the measuring axes are offset relative to one another by an angle of 90°.

12. The ground compaction roller according to claim 4, wherein the circular support wall is opposite a circular support wall carrying an exciter motor, and/or at a side at which a travel motor is arranged to rotate the roller drum about the rotation axis.

13. The ground compaction roller according to claim 1, wherein the exciter device is arranged to generate oscillations and/or vibrations of the roller drum.

14. The ground compaction roller according to claim 13, wherein the exciter device comprises an imbalance mass arranged on the exciter shaft to generate the oscillations and/or the vibrations of the roller drum as the exciter shaft rotates.

15. The ground compaction roller according to claim 1, wherein the exciter device comprises an exciter motor, and the exciter shaft is driven by the exciter motor.

16. The ground compaction roller according to claim 1, wherein the exciter motor comprises a hydraulic motor.

17. A method for ascertaining ground stiffness during ground compaction with a ground compaction roller, wherein the ground compaction roller comprises
   a machine frame;
   a drive unit;

at least one roller drum mounted on the machine frame for rotation about a rotation axis;

an exciter device arranged at least partially in the roller drum;

at least one sensor device configured to measure compaction of ground achieved by passage of the ground compaction roller;

wherein the sensor device is arranged on the roller drum in a region of the rotation axis and rotates together with the roller drum during operation of the ground compaction roller;

wherein the sensor device includes an electrical power supply which is independent of an on-board grid of the ground compaction roller;

wherein the sensor device is supplied with electrical power through a generator driven by an exciter shaft of the exciter device; and wherein the method comprises:

a) measuring acceleration directly on, and in a region of the rotation axis of, the roller drum which rotates in working operation;

b) ascertaining the ground stiffness from the measured acceleration; and c) wirelessly transmitting the measured acceleration and/or the ground stiffness to a receiving device.

18. The method according to claim 17, comprising measuring, in step a), the acceleration using two accelerometers having measuring axes which are offset relative to one another.

19. The method according to claim 18, comprising ascertaining, in step b), a direction of gravitational acceleration from the measured acceleration of the two accelerometers.

20. The method according to claim 17, comprising transferring, in step b), the measured acceleration into a reference system which does not rotate together with the roller drum.

* * * * *